United States Patent
Khatri et al.

(10) Patent No.: US 11,932,766 B2
(45) Date of Patent: Mar. 19, 2024

(54) ASPHALT MODIFICATION WITH RECYCLED PLASTIC AND CRUMB RUBBER FOR PAVING, ROOFING, WATERPROOFING AND DAMP PROOFING

(71) Applicant: Saudi Arabian Oil Company, Dhahran (SA)

(72) Inventors: Waseem Khatri, Dhahran (SA); Mohammed Al-Mehthel, Dhahran (SA); Carlos Ernesto Acero, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 171 days.

(21) Appl. No.: 17/217,697

(22) Filed: Mar. 30, 2021

(65) Prior Publication Data

US 2022/0315765 A1 Oct. 6, 2022

(51) Int. Cl.
    *C08L 95/00* (2006.01)
(52) U.S. Cl.
    CPC ........ *C08L 95/00* (2013.01); *C08L 2205/035* (2013.01); *C08L 2207/22* (2013.01)
(58) Field of Classification Search
    CPC ..................................................... C08L 95/00
    See application file for complete search history.

(56) References Cited

U.S. PATENT DOCUMENTS

| | | | |
|---|---|---|---|
| 5,422,051 A | 6/1995 | Sawyers | |
| 5,702,199 A | 12/1997 | Fishback et al. | |
| 5,719,215 A | 2/1998 | Liang et al. | |
| 5,827,568 A | 10/1998 | Wickett | |
| 6,000,877 A | 12/1999 | Fishback et al. | |
| 6,346,561 B1 | 2/2002 | Osborn | |
| 6,380,284 B1 | 4/2002 | Lopez | |
| 6,844,418 B2 | 1/2005 | Forgac et al. | |
| 7,811,373 B2 | 10/2010 | Partanen et al. | |
| 9,056,971 B2 | 6/2015 | Fu et al. | |
| 10,246,578 B2 | 4/2019 | Tamir | |

(Continued)

FOREIGN PATENT DOCUMENTS

| CA | 2800435 A1 | 6/2014 |
|---|---|---|
| CA | 2902935 A1 | 3/2017 |

(Continued)

OTHER PUBLICATIONS

Ming et al., "Extruded Tire Crumb-Rubber Recycled Polyethylene Melt Blend as Asphalt Composite Additive for Enhancing the Performance of Binder", Journal of Materials in Civil Engineering, vol. 32, Issue No. 3, Dec. 24, 2019.

(Continued)

*Primary Examiner* — Arrie L Reuther
(74) *Attorney, Agent, or Firm* — Bracewell LLP; Constance G. Rhebergen; Eleanor T. Porter (57) ABSTRACT

An asphalt composition has a modified asphalt binder. The modified asphalt binder includes an initial binder, an elemental sulfur, a recycled plastic, and a crumb rubber, the crumb rubber including a recycled material. The recycled plastic and the crumb rubber together define a binder modifier. The binder modifier and the initial binder together define an intermediate binder. The elemental sulfur is in an amount of 30 to 50 weight percent, by weight of the modified asphalt binder. The crumb rubber is in an amount of 10 to 20 weight percent, by weight of the intermediate binder.

5 Claims, 3 Drawing Sheets

(56) References Cited

U.S. PATENT DOCUMENTS

| | | |
|---|---|---|
| 2001/0004649 A1 | 6/2001 | Osborn |
| 2011/0233105 A1 | 9/2011 | Bailey |
| 2012/0167802 A1 | 7/2012 | Huh |
| 2013/0217809 A1 | 8/2013 | Formela et al. |
| 2020/0263005 A1 | 8/2020 | Tamir |

FOREIGN PATENT DOCUMENTS

| | | |
|---|---|---|
| EP | 1960472 A1 | 8/2008 |
| EP | 3124546 A1 | 1/2017 |

OTHER PUBLICATIONS

Parthiban et al., "Recycled Rubber Asphalt", International Journal of Pure and Applied Mathematics, vol. 119, No. 17, pp. 151-160, 2018.

Zhang et al., "Experimental Evaluation of Crumb Rubber and Polyethylene Integrated Modified Asphalt Mixture Upon Related Properties", Road Materials and Pavement Design, 2018, vol. 20, No. 6, pp. 1413-1428.

ASPHALT MODIFICATION WITH RECYCLED PLASTIC AND CRUMB RUBBER FOR PAVING, ROOFING, WATERPROOFING AND DAMP PROOFING

BACKGROUND OF THE DISCLOSURE

1. Field of the Disclosure

The present disclosure relates to asphalt compositions. More specifically, the disclosure relates to asphalt binder compositions including asphalt, elemental sulfur, recycled plastic, and crumb rubber, and methods of making the same.

2. Description of the Related Art

As modern commerce depends on reliable and cost-effective methods for delivering products from suppliers to users, the availability of durable and reliable highways, roads, and other support surfaces for vehicles is vital for sustaining a modern economy. To provide better support surfaces, highways, roads, and sidewalks are commonly paved with a layer or mat of asphaltic concrete that is laid over the surface of the sub-base. Asphalt is preferred over cement to pour roads because it is less expensive and very durable. Asphalt can also be poured at night, which allows major roads to be shut down at the least busy of times for maintenance. Relative to road noise, asphalt is also quieter than cement, making it the better choice for roads.

Asphalts can also be used in roofing, waterproofing and damp proofing applications. Asphalts are essentially mixtures of bitumen, as binder, with aggregate, in particular filler, sand, and stones. There are many different types of asphalts available and their characteristics can vary quite significantly. The design of asphalts for bituminous applications is a complex process of selecting and proportioning materials to obtain the desired properties in the finished construction while minimizing undesirable characteristics.

SUMMARY OF THE DISCLOSURE

Compositions of this disclosure and the associated methods of making such compositions are suitable for paving, roofing, waterproofing, and damp proofing applications. Embodiments of this disclosure provide a binder modification for an asphalt composition that includes recycled plastic crumb rubber, and elemental sulfur.

In an embodiment of this disclosure, an asphalt composition has a modified asphalt binder including: an initial binder, an elemental sulfur, a recycled plastic, and a crumb rubber. The crumb rubber includes a recycled material. The recycled plastic and the crumb rubber together define a binder modifier. The binder modifier and the initial binder together define an intermediate binder. The elemental sulfur is in an amount of 30 to 50 weight percent, by weight of the modified asphalt binder. The crumb rubber is in an amount of 10 weight percent to 20 weight percent, by weight of the intermediate binder.

In alternate embodiments, the asphalt composition an further include an aggregate and the modified asphalt binder can be in an amount of a range of 4 weight percent to 6 weight percent, by weight of the asphalt composition. The aggregate can include up to 30 weight percent of recycled asphalt pavement, by weight of the aggregate. The recycled plastic can be in an amount of 1 to 10 weight percent, by weight of the intermediate binder. A ratio of the recycled plastic to the crumb rubber can be 1:2. The asphalt composition can further include a filler selected from a group consisting of a limestone powder, a cement dust, an oil ash, and a combination of such fillers. The filler can be in an amount of up to 50 weight percent, by weight of the asphalt composition.

In an alternate embodiment of the disclosure, a method for forming an asphalt composition includes mixing an aggregate with a recycled plastic at 140 degrees Celsius so that the aggregate is coated with the recycled plastic to form a coated aggregate. A crumb rubber is added to the coated aggregate and the crumb rubber is mixed with the coated aggregate at a temperature of 140 to 180 degrees Celsius to for 30 to 60 seconds. An initial binder is added to the crumb rubber and the coated aggregate. An elemental sulfur is added to the coated aggregate, the crumb rubber, and the initial binder and the elemental sulfur is mixed with the coated aggregate, the crumb rubber, and the initial binder at a temperature of up to 140 degrees Celsius. The recycled plastic and the crumb rubber together define a binder modifier. The binder modifier and the initial binder together define an intermediate binder. The intermediate binder and the elemental sulfur together define a modified asphalt binder. The elemental sulfur is in an amount of 30 to 50 weight percent, by weight of the modified asphalt binder. The crumb rubber is in an amount of 10 to 20 weight percent, by weight of the intermediate binder.

In alternate embodiments, the aggregate and the recycled plastic can be mixed for 30 seconds. The recycled plastic can be in an amount of 1 weight percent, and up to 10 weight percent, by weight of the intermediate binder. The method can further include curing the asphalt composition so that the crumb rubber swells into the initial binder.

In another alternate embodiment of this disclosure, a method for forming an asphalt composition includes mixing an initial binder with a crumb rubber at 180 degrees Celsius. An aggregates is heated to 140 degrees Celsius. A recycled plastic is added to the aggregates and the recycled plastic and the aggregates are mixed together for 30 seconds at 140 degrees Celsius. The mixed initial binder and the crumb rubber are introduced to the mixed recycled plastic and aggregate, and the initial binder, the crumb rubber, the recycled plastic, and the aggregate are mixed at 140 to 180 degrees Celsius. An elemental sulfur is added to the initial binder, the crumb rubber, the recycled plastic, and the aggregates, and the initial binder, the crumb rubber, the recycled plastic, and the aggregates are mixed at 140 degrees Celsius for 30 seconds. The recycled plastic and the crumb rubber together define a binder modifier. The binder modifier and the initial binder together define an intermediate binder. The intermediate binder and the elemental sulfur together define a modified asphalt binder. The elemental sulfur is in an amount of 30 to 50 weight percent, by weight of the modified asphalt binder. The crumb rubber is in an amount of 10 to 20 weight percent, by weight of the intermediate binder.

In alternate embodiments, the aggregate can include up to 30 weight percent of recycled asphalt pavement, by weight of the aggregate. The aggregate can be a filler selected from a group consisting of a limestone powder, a cement dust, an oil ash, and a combination of such fillers. The filler can be in an amount of up to 50 weight percent, by weight of the asphalt composition.

In yet another alternate embodiment of this disclosure, a method for forming an asphalt composition includes blending a recycled plastic with a crumb rubber to form a binder modifier. An initial binder can be added to the binder modifier and the initial binder can be mixed with the binder modifier at a temperature of up to 140 degrees Celsius for 30 to 60 seconds to form an intermediate binder. An elemental sulfur can be added to the intermediate binder and mixing the elemental sulfur with the intermediate modifier at a temperature of up to 140 degrees Celsius for 30 to 60 seconds to form a modified asphalt binder. The elemental sulfur is in an amount of 30 to 50 weight percent, by weight of the modified asphalt binder. The recycled plastic is in an amount of 1 to 10 weight percent, by weight of the intermediate binder. The crumb rubber is in an amount of 10 to 20 weight percent, by weight of the intermediate binder.

In alternate embodiments, the method can further include blending the recycled plastic with the crumb rubber to form the binder modifier as pellets. The binder modifier can be added to an aggregate before adding the initial binder to the binder modifier. Blending the recycled plastic with the crumb rubber can include blending the recycled plastic with the crumb rubber at a ratio of 1:2. The method can further include adding a filler, where the filler is selected from a group consisting of a limestone powder, a cement dust, an oil ash, and a combination of such fillers.

In still yet another embodiment of the disclosure, a method for forming an asphalt composition includes blending a recycled plastic with a crumb rubber and an elemental sulfur to form a sulfur binder modifier. An initial binder is added to the sulfur binder modifier and the initial binder is mixed with the sulfur binder modifier at a temperature of up to 140 degrees Celsius for 30 to 60 seconds to form a modified asphalt binder. The elemental sulfur is in an amount of 30 to 50 weight percent, by weight of the modified asphalt binder. The recycled plastic, the crumb rubber, and the binder modifier together define an intermediate binder. The crumb rubber is in an amount of greater than 10 weight percent, and up to 20 weight percent, by weight of the intermediate binder.

In alternate embodiments, the recycled plastic can be blended with the crumb rubber and the elemental sulfur at a temperature range of 140 to 180 degrees Celsius for 30 to 60 seconds to form the sulfur binder modifier as pellets. The method can further include adding a filler. The filler can be selected from a group consisting of a limestone powder, a cement dust, an oil ash, and a combination of such fillers.

BRIEF DESCRIPTION OF THE DRAWINGS

So that the manner in which the features, aspects and advantages of the embodiments of this disclosure, as well as others that will become apparent, are attained and can be understood in detail, a more particular description of the disclosure may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Embodiments of this disclosure provide asphalt compositions and methods of forming such asphalt compositions. The composition can include, in the least, an initial binder, elemental sulfur, a recycled plastic, and crumb rubber. Elemental sulfur can also be included in the asphalt composition. As used in this disclosure, the term asphalt is interchangeable with the term bitumen.

As used in this disclosure, the term initial binder refers to an asphalt or bitumen that has not be modified. As used in this disclosure, the term binder modifier refers to the combination of the recycled plastic and crumb rubber. As used in this disclosure, the intermediate binder includes the initial binder and the binder modifier. As used in this disclosure, the modified asphalt binder includes the intermediate binder, and elemental sulfur, if any.

Figure 1:
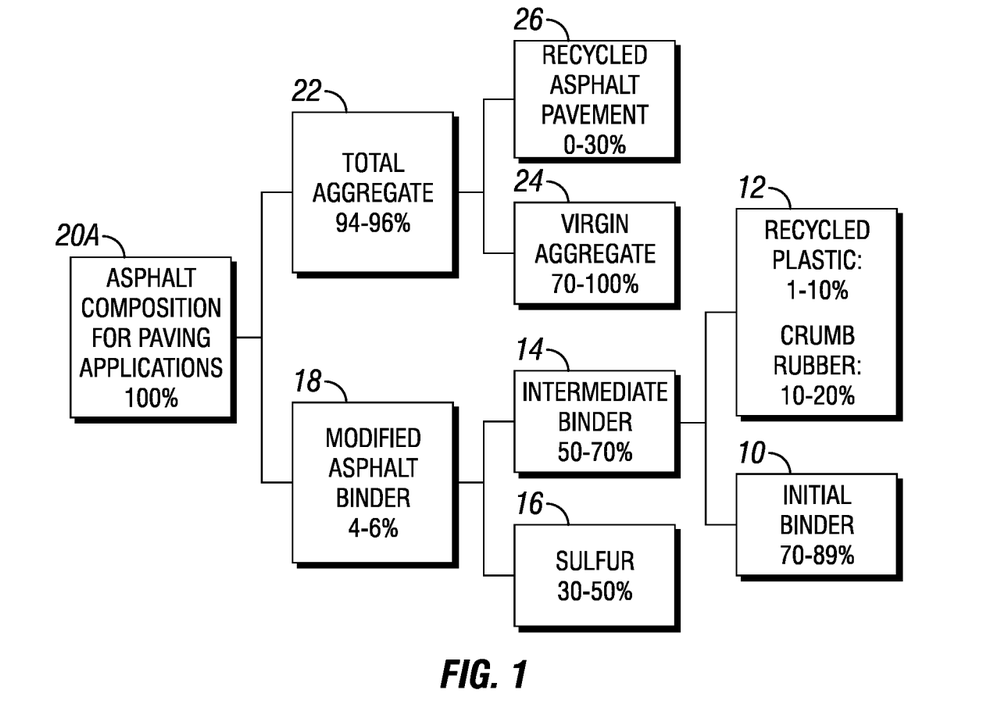
FIG. 1 shows a chart showing the components that make up an asphalt composition for paving applications that includes a modified asphalt binder, in accordance with an embodiment of this disclosure.
Figure 2:
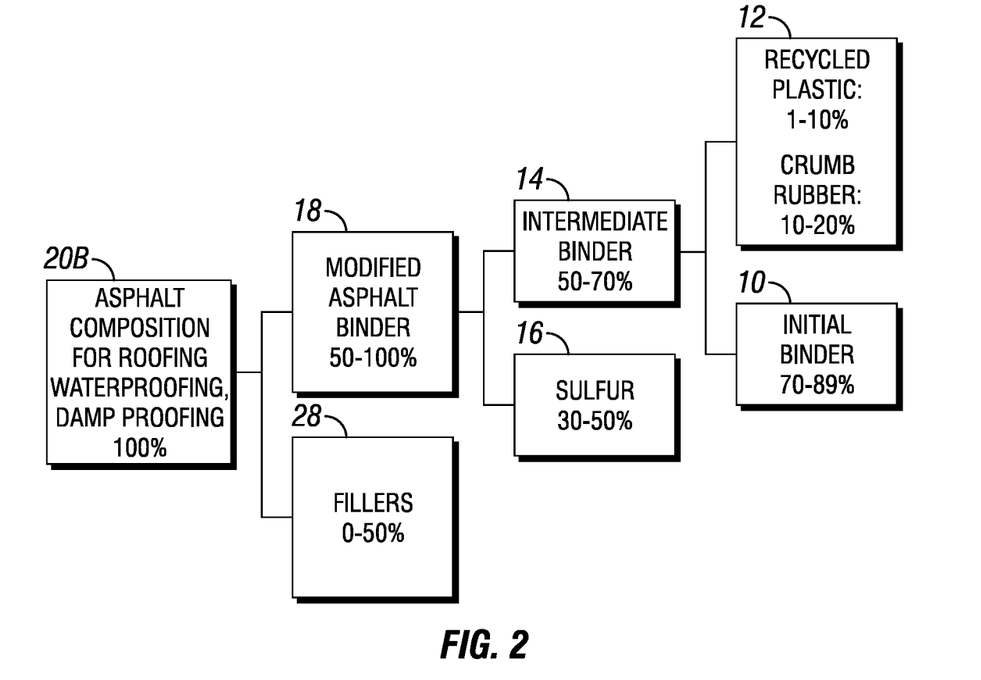
FIG. 2 shows a chart showing the components that make up an asphalt composition for roofing, waterproofing, or damp proofing applications that includes a modified asphalt binder, in accordance with an embodiment of this disclosure.

Looking at Table 1 and FIGS. 1-2, the possible range of each component of the asphalt composition is disclosed.

TABLE 1

Weight composition ranges of modified asphalt binder.

| Component of Modified Asphalt Binder | Possible range % |
|---|---|
| Initial Binder (wt % of Intermediate Binder) | 70-89 |
| Binder Modifier | |
| Recycled Plastic (wt % of Intermediate Binder) | 1-10 |
| Crumb Rubber (wt % of Intermediate Binder) | 10-20 |
| Elemental sulfur (wt % of Modified Asphalt Binder) | 30-50 |

Looking at FIGS. 1-2, initial binder 10 and binder modifier 12 can be part of intermediate binder 14. In embodiments of this disclosure, the initial binder 10 can be in an amount of 70 to 89 weight percent, by weight of intermediate binder 14. In embodiments of this disclosure, binder modifier 12 can be in an amount of 11 to 30 weight percent, by weight of intermediate binder 14. Binder modifier 12 can include the recycled plastic and the crumb rubber. The recycled plastic can be in an amount in a range of 1 to 10 weight percent, by weight of intermediate binder. The crumb rubber can be in an amount in a range of 10 to 20 weight percent, by weight of intermediate binder.

In embodiments of this disclosure, the elemental sulfur 16 can be in an amount of 30 to 50 weight percent, by weight of modified asphalt binder 18. Intermediate binder 14 can make up the remaining portion of modified asphalt binder 18. Therefore in embodiments of this disclosure, intermediate binder 14 can be in an amount of 50 to 70 weight percent, by weight of modified asphalt binder 18.

In the example embodiments of FIGS. 1-2, initial binder 10 is in an amount of 70 to 89 weight percent, by weight of intermediate binder 14, and intermediate binder 14 is in an amount of 50 to 70 weight percent, by weight of modified asphalt binder 18. In such embodiments, initial binder 10 can therefore be in an amount in a range of 35 to 62.3 weight percent of modified asphalt binder 18.

In the example embodiments of FIGS. 1-2, the recycled plastic is in an amount of 1 to 10 weight percent, by weight of intermediate binder 14, and intermediate binder 14 is in an amount of 50 to 70 weight percent, by weight of modified asphalt binder 18. In such embodiments, the recycled plastic can therefore be in an amount in a range of 0.5 to 7 weight percent by weight of modified asphalt binder 18.

In the example embodiments of FIGS. 1-2, the crumb rubber is in an amount of 10 to 20 weight percent, by weight of intermediate binder 14, and intermediate binder 14 is in an amount of 50 to 70 weight percent, by weight of modified asphalt binder 18. In such embodiments, the crumb rubber can therefore be in an amount in a range of 5 to 14 weight percent by weight of modified asphalt binder 18.

The asphalt composition can include the modified asphalt binder as well as other components that may be of use for the intended application of the modified asphalt binder. As an example, Table 2 and FIG. 1 include the components of an asphalt composition that can be used for paving applications. In paving applications, the modified asphalt binder can be combined with aggregates to form the asphalt composition.

TABLE 2

Weight composition ranges of asphalt composition for paving applications.

| Component of Asphalt Composition For Paving Applications (as wt % of asphalt composition) | Possible range |
|---|---|
| Modified Asphalt Binder | 4-6 |
| Virgin Aggregate | 70-100 |
| Course Aggregate | 40-60 |
| Fine Aggregate | 25-35 |
| Other Filler | 2-5 |
| Recycled Asphalt Pavement | 0-30 |

Looking at FIG. 1, asphalt composition 20A that is used for paving applications can include a total aggregate 22 and the modified asphalt binder 18. In embodiments of this disclosure where modified asphalt binder 18 is in an amount of 4 to 6 weight percent, by weight of asphalt composition 20A the remaining components of asphalt composition 20A can be aggregates.

Total aggregate 22 can include a virgin aggregate. Virgin aggregate 24 can include a mix of course aggregate, fine aggregate, and other filler, as described in Table 2. In embodiments of this disclosure, virgin aggregate 24 can be in an amount of 70 to 100 weight percent, by weight of total aggregate 22.

Total aggregate 22 can further include a recycled asphalt pavement 26. In embodiments of this disclosure, recycled asphalt pavement 26 can be in an amount of 0 to 30 weight percent, by weight of total aggregate 22. The use of recycled asphalt pavement can reduce the amount of new or virgin aggregates used in the asphalt composition.

Although FIG. 1 shows a binder modifier 12, an intermediate binder 14, and a modified asphalt binder 18, such features are shown only to explain the range of the amounts of the components used to make up asphalt composition 20A. FIG. 1 does not depict the order of mixing the components of asphalt composition 20A. Depending on the method of making asphalt composition 20A, binder modifier 12, intermediate binder 14, or modified asphalt binder 18 may not exist as separate combinations during the making of asphalt composition 20A.

As an alternate example, Table 3 and FIG. 2 include the components of an asphalt composition that can be used for roofing, waterproofing, or damp proofing. In roofing, waterproofing, or damp proofing applications, the modified asphalt binder can be combined with fillers to form the asphalt composition.

TABLE 3

Weight composition ranges of asphalt composition for roofing, waterproofing, or damp proofing applications.

| Component of Asphalt Composition For roofing, Waterproofing, or Damp Proofing Applications (as wt % of asphalt composition) | Possible range |
|---|---|
| Modified Asphalt Binder | 50 to 100% |
| Fillers | 0-50% |

Looking at FIG. 2, for asphalt composition 20B that is used for roofing, waterproofing, or damp proofing applications can be formed of modified asphalt binder 18 and fillers 28. In embodiments of this disclosure, modified asphalt binder 18 can be in an amount of 50 to 100 weight percent, by weight of asphalt composition 20B. Fillers 28 can be in an amount of 0 to 50 weight percent, by weight of asphalt composition 20B.

Although FIG. 2 shows a binder modifier 12, an intermediate binder 14, and a modified asphalt binder 18, such features are shown only to explain the range of the amounts of the components used to make up asphalt composition 20B. FIG. 1 does not depict the order of mixing the components of asphalt composition 20B. Depending on the method of making asphalt composition 20B, binder modifier 12, intermediate binder 14, or modified asphalt binder 18 may not exist as separate combinations during the making of asphalt composition 20B.

Initial Binder

There are many different types of asphalts available and their characteristics can vary quite significantly. An asphalt material can be a singular material or a blend of several initial binders. All asphalts contain asphaltenes. Asphaltene concentration can vary in amount and functionality depending on the source of the initial binder. As used in this disclosure, the term asphalt is interchangeable with the term bitumen. Asphalt is used as a glue to bind the ingredients of the asphalt composition.

Bitumen and asphalt that are useful as the asphalt binder can originate from petroleum distillation (for example, vacuum tails); coal, tar sands or oil shale processing; or from naturally occurring sources (for example, Trinidad Lakes).

In embodiments of this disclosure, the asphalt is an unmodified petroleum asphalt cement derived from the refining of crude oil. In certain embodiments, the asphalts can be low to moderate stiffness asphalt cements with the following characteristics:

1) a penetration of 60-70 or higher when classified in accordance with ASTM D946/D946M-20, (Standard Specification for Penetration-Graded Asphalt Binder for Use in Pavement Construction, ASTM International, West Conshohocken, PA, 2020) or AASHTO M20 (Guide Specifications for Highway Construction, American Association of State Highway and Transportation Officials, 70th Edition, 2000—Standard Specification for Penetration-Graded Asphalt Cement);

2) classified as AC-20 or below when classified in accordance with ASTM D3381 (Standard Specification for Viscosity-Graded Asphalt Binder for Use in Pavement Construction, ASTM International, West Conshohocken, PA, 2018) or AASHTO M226 (Guide Specifications for Highway Construction, American Association of State Highway and Transportation Officials, 80th Edition, 2004—Standard Specification for Viscosity-Graded Asphalt Cement); or 3) with a performance grade of 64-XX or below when classified in accordance with ASTM D6373 (Standard Specification for Performance Graded Asphalt Binder, ASTM International, West Conshohocken, PA, 2016) or AASHTO M320 (Guide Specifications for Highway Construction, American Association of State Highway and Transportation Officials, 2017 Edition, 2017—Standard Specification for Performance-Graded Asphalt Binder) standard methods.

Elemental Sulfur

Sulfur, especially "free" or "elemental" sulfur, is an abundant and inexpensive material. Elemental sulfur is naturally occurring. Elemental sulfur is also a byproduct of non-sweet natural gas and petroleum processing. Sources of free sulfur include petroleum refineries and gas sweetening plants. Because of the quantity of sulfur extracted from natural gas and petroleum, many sulfur producers consider elemental sulfur a waste product. It is desirable to find commercial uses for elemental sulfur. Incorporating sulfur into commercial products can transform what many consider a potential "waste" product into a product that has practical value.

Elemental sulfur includes not only singular sulfur atoms but also sulfur in complexes and covalently bonded to other sulfur atoms, including α-sulfur (orthorhombic sulfur), β-sulfur (monoclinic sulfur), and "catena" sulfur. Chains or rings of sulfur atoms range from a few sulfur atoms to hundreds of covalently linked sulfur atoms. Because of the wide variety of allotropes, elemental sulfur is found in many different solid and liquid forms, and changes between forms based upon modifications to its environment.

Sulfur covalently bonded with non-sulfur atoms, such as carbon, hydrogen or other atomic species, including heterorganic compounds, is not "free" or elemental sulfur. Elemental sulfur should not contain any significant amounts of impurities.

In embodiments of this disclosure, the elemental sulfur can be in a pelletized form with low dust particles content. The pellets can have a minimum of free elemental sulfur content of 99.8% dry basis. The ash content of the elemental sulfur will not exceed 0.05%, the moisture content of the elemental sulfur shall not exceed 3%, and the hazardous contaminants of the elemental sulfur, such as arsenic, selenium, and tellurium, shall not exceed 0.25, 1 and 1 ppm, respectively.

In embodiments of this disclosure, the elemental sulfur can be in an amount of 30 to 50 weight percent, by weight of the modified asphalt binder. In alternate embodiments of this disclosure, the elemental sulfur is in an amount of 50 weight percent, by weight of the modified asphalt binder. In other alternate embodiments of this disclosure, the elemental sulfur is in an amount of 30 weight percent, by weight of the modified asphalt binder.

By including sulfur in an amount of at least 30 weight percent, by weight of asphalt binder, the resulting asphalt composition will have an improved rutting resistance and a lower viscosity compared to asphalt compositions having less sulfur. An asphalt composition with a lower viscosity will be more workable and easier to handle and compact than an asphalt composition with a higher viscosity. The elemental sulfur in the modified asphalt binder can act as a vulcanization agent to assist in converting the crumb rubber into a cross-linked polymer with improved mechanical properties.

In certain embodiments of this disclosure, the amount of elemental sulfur can be higher than 30 weight percent, by weight of asphalt binder to provide the asphalt composition with a lower modulus of elasticity. This could be particularly useful asphalt compositions for paving applications in hot climates.

When heated, sulfur can form hydrogen sulfide ($H_2S$) gas, which is toxic to humans, starting at around 150° C. Above that temperature, free sulfur in hydrocarbon environments dehydrogenates hydrocarbons and forms hydrogen sulfide. Heating sulfur to high temperatures in the presence of oxygen forms sulfur dioxide, which is noxious to humans and is an air pollutant. It is desirable to find a combination of asphalt materials that can be mixed at temperatures no greater than 150° C. for worker comfort and safety as well as being safer to the environment. Therefore, in embodiments of this disclosure, elemental sulfur is added and mixed at a temperature of up to 140 degrees Celsius. Using a mixing temperature of 140 degrees Celsius or lower will require less energy and result in fewer CO2 emissions than a mixing process that is performed at a temperature of greater than 140 degrees Celsius.

In alternate embodiments, components of the composition, other than the elemental sulfur, can be blended at a temperature in a range of 140 to 180 degrees Celsius.

Recycled Plastic

The recycled plastic can be a recycled low grade plastic such as waste bottles, cups, or plastic bags. The recycled plastic can be free of any virgin plastics, containing only recycled plastic material.

In example embodiments, the recycled plastic can be a low density polyethylene (LDPE), linear low density polyethylene (LLDPE), or high density polyethylene (HDPE). The melting points of the recycled plastic of embodiments of this disclosure can be in a range of 110 to 140 degrees Celsius. In embodiments of this disclosure, the recycled plastic can have a specific density in a range of 0.91 to 0.965 g/cm$^3$ in accordance with ASTM D792 (standard Test Methods for Density and Specific Gravity (Relative Density) of Plastics by Displacement, ASTM International, West Conshohocken, PA, 2020). In embodiments of this disclosure, the recycled plastic can have a melt flow rate to be 0.20 to 0.5 g/10 min in accordance with ASTM D1238 (Standard Test Method for Melt Flow Rates of Thermoplastics by Extrusion Plastometer, ASTM International, West Conshohocken, PA, 2020).

The use of a recycled plastic allows for low grade plastics to be used for paving, roofing, waterproofing and damp proofing applications instead of ending up in a landfill. The use of recycled plastic will promote use of recycled materials, sustainability, reduce CO2 emissions, and reduce the depletion of natural resources, while enhancing the properties of asphalt compositions and improving the performance of the resulting paving, roofing, waterproofing, and damp proofing products. Ethylene vinyl acetate (EVA) and ethylene-butyl acrylate (EBA) are examples of virgin thermoplastics that can be expensive to source. The LDPE, LLDPE and HDPE recycled plastic can be more readily available and a more economical source of plastic than EVA or EBA for use in the modified asphalt binder.

In embodiments of this disclosure, the recycled plastic can be in an amount of 1 to 10 weight percent, by weight of the intermediate binder. In alternate embodiments of this disclosure, the recycled plastic can be in an amount of 10 weight percent, by weight of the intermediate binder.

Crumb Rubber

As is understood in the art, "crumb rubber" refers to a material that is a byproduct of tire retreading and scrapping. Therefore the crumb rubber is a recycled material derived from a waste product rather than a newly manufactured material, which reduces the overall cost of the asphalt composition compared to compositions that use a newly manufactured virgin polymer. In certain embodiments, the crumb rubber can be free of virgin polymers.

In an example embodiment, the source of the used rubber used to form the crumb rubber can be waste passenger vehicle or truck tires car. The rubber from the tires can be ground or granulated at ambient temperatures to increase the surface area. The crumb rubber can be sized to that 100 percent of the crumb rubber passes through a #10 (2.00 mm) sieve.

In embodiments of this disclosure the crumb rubber is in an amount of at least 10 weight percent, and up to 20 weight percent, by weight of the intermediate binder. In alternate embodiments, the crumb rubber is in an amount of 20 weight percent, by weight of the intermediate binder. In other alternate embodiments, the crumb rubber is in an amount of 12 weight percent, by weight of the intermediate binder. In still other alternate embodiments, the ratio of recycled plastic to crumb rubber is 1:2.

Aggregates and Fillers

Asphalt products can include aggregates or fillers or a combination of aggregates and fillers. As one of ordinary skill will appreciate, various types of conventional aggregates and fillers can be used in the asphalt compositions. Aggregate can include multiple types or sizes of products. Aggregate can include, for example, sand, gravel, crushed rock, slag, or any other type of aggregate. When aggregates of various sizes are used, the smaller aggregate materials can fill voids between the larger aggregate materials, thus creating a denser matrix. Fine aggregates, also referred to as "fines," can include natural sand, crushed stone, or other suitable fine particles, that can pass through a no. 4 sieve, which is a sieve having 4.75 mm sized openings. Coarse aggregates generally include gravel or crushed stone with particles of a size that will be retained in a no. 4 sieve and typically are between 9.5 mm and 37.5 mm.

In embodiments of this disclosure, an asphalt composition used for paving applications can include the modified asphalt binder as well as a course aggregate, a fine aggregate, a filler, or any combination of a course aggregate, a fine aggregate, and a filler. The filler can include fly ash, steel dust, lime, limestone powder, cement dust, oil ash, and combinations of such fillers. The filler can be sized to pass through a no. 200 sieve, which is a sieve having 0.075 mm openings.

In certain embodiments where an aggregate is included in the asphalt composition, the aggregate can be in an amount of 94 to 96 weight percent, by weight of the asphalt composition.

In embodiments when the asphalt composition is used for paving, the aggregate of the asphalt composition can alternately include recycled asphalt pavement. The use of recycled asphalt pavement can reduce the amount of new or virgin aggregates used in the asphalt composition. The asphalt composition can include up to 30 weight percent of recycled asphalt pavement, by weight of the aggregate.

In embodiments of this disclosure, an asphalt composition used for roofing, waterproofing, or damp proofing applications can include fillers. The fillers can include, for example, limestone powder, cement dust, oil ash, or combinations of such filler. In such embodiments, the filler can be in an amount of 0 to 50 weight percent, by weight of asphalt composition.

Dry Mixing Method

Figure 3:
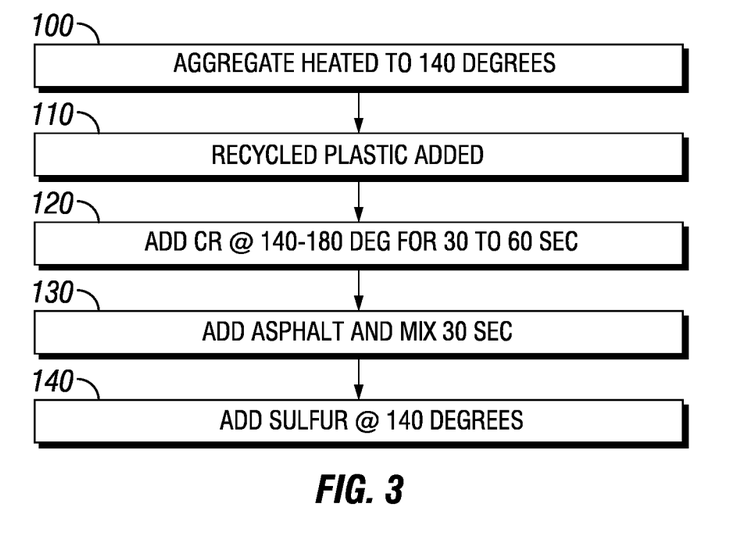
FIG. 3 shows the steps of a dry mixing method for forming an asphalt composition having a modified asphalt binder, in accordance with an embodiment of this disclosure.

Looking at FIG. 3, in another aspect of the disclosure, a dry mixing method can be used for making the asphalt composition. In step 100, the dry mixing method incudes heating aggregates to 140 degrees Celsius in a pug mill. In step 110 the recycled plastic is added to the aggregates. The recycled plastics can be mixed with the aggregates at 140 degrees Celsius in the pug mill so that the aggregate is coated with the recycled plastic to form a coated aggregate. In certain embodiments, the aggregate and the recycled plastic are mixed for 30 seconds.

In step 120 the crumb rubber can then be added to the coated aggregate in the pug mill. The crumb rubber can be mixed with the coated aggregate at a temperature of 140 to 180 degrees Celsius to for 30 to 60 seconds.

After the crumb rubber has been well digested with the plastic, the initial binder is added in step 130. The initial binder can be mixed with the crumb rubber and the coated aggregate for 30 seconds in the pug mill.

In step 140 the elemental sulfur can then be added to the initial binder, crumb rubber, and coated aggregate. The elemental sulfur can be mixed with the initial binder, crumb rubber, and coated aggregate at a temperature of up to 140 degrees Celsius in the pug mill.

In certain embodiments, when using a dry mixing method, the recycled plastic can be in an amount of 1 weight percent, and up to 10 weight percent, by weight of the intermediate binder. The crumb rubber can be in an amount of 10 weight percent, and up to 20 weight percent, by weight of the intermediate binder. In alternate embodiments the elemental sulfur can be in an amount of 30 to 50 weight percent, by weight of the modified asphalt binder.

In alternate embodiments when using a dry mixing method, the asphalt composition can be cured so that the crumb rubber swells into the initial binder.

Wet Mixing Method

Figure 4:
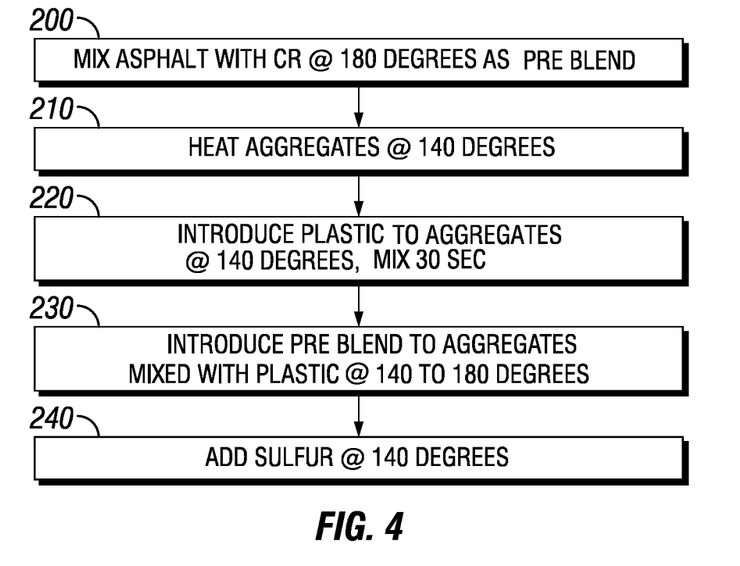
FIG. 4 shows the steps of a wet mixing method for forming an asphalt composition having a modified asphalt binder, in accordance with an embodiment of this disclosure.

Looking at FIG. 4, in another aspect of the disclosure, a wet mixing method can be used for making the asphalt composition. In an example embodiment, the wet mix method of FIG. 4 can be carried out in a high shear mixer. The resulting mixture can be maintained in a reaction tank equipped with internal heating coils and a horizontal auger agitator to maintain the crumb rubber within a homogeneous mix. In embodiments using the wet mixing method, in step 200 the initial binder can be mixed with the crumb rubber at 180 degrees Celsius.

In step 210 the aggregates can be heated to 140 degrees Celsius. The aggregates can be, for example, an aggregate, a filler, or a combination of aggregates and fillers. The heating of the aggregates can take place within a heating chamber after the aggregates are taken from a cold bin and measured. The heating chamber can be, as an example, a drying drum of a hot mix plant.

In step 220 the recycled plastic can be added to the aggregates and the aggregates and the recycled plastic can be mixed together for 30 seconds at 140 degrees Celsius. The aggregates and the recycled plastic can be mixed in a pug mill.

In step 230 the initial binder and crumb rubber mix can be introduced to the recycled plastic and aggregate mix. The initial binder, crumb rubber, recycled plastic, and aggregate can be mixed at 140 to 180 degrees Celsius. The initial binder, crumb rubber, recycled plastic, and aggregate can be mixed in a pug mill.

In step 240 the elemental sulfur can be added to the initial binder, crumb rubber, recycled plastic, and aggregates and can be mixed at 140 degrees Celsius for 30 seconds. The mixing in step 240 can take place in a pug mill.

In alternate embodiments when using a wet mixing method, the aggregates of the asphalt composition can include up to 30 weight percent of recycled asphalt pavement, by weight of the aggregates.

In other alternate embodiments, a filler can be added. The filler can be, for example, a limestone powder, a cement dust, an oil ash, and a combination of such fillers. The filler can be in an amount of up to 50 weight percent, by weight of the asphalt composition.

Pre-Blend Mixing Method

Figure 5:
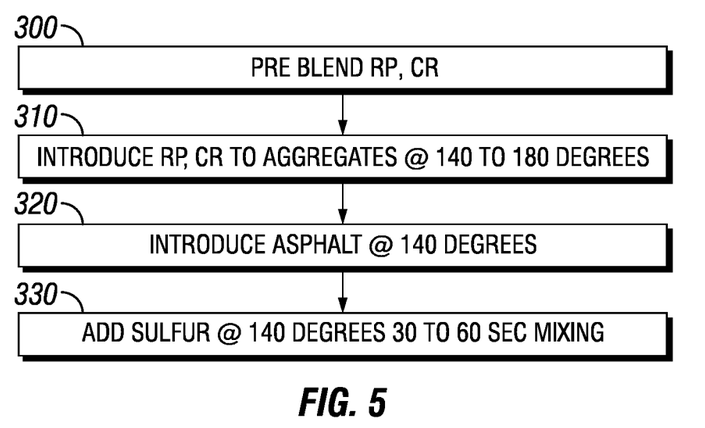
FIG. 5 shows the steps of a pre-blend mixing method for forming an asphalt composition having a modified asphalt binder, in accordance with an embodiment of this disclosure.

Looking at FIG. 5, in another aspect of the disclosure, a pre-blend mixing method can be used for making the asphalt composition. In embodiments using the pre-blend mixing method, in step 300 the recycled plastic and crumb rubber are blended together to form a binder modifier. The recycled plastic and crumb rubber are blended at 140 to 180 degrees Celsius for 30 seconds. The blending can take place in silos and the mixture can be mechanically agitated to maintain the consistency of the mixture.

In embodiments when an aggregate is included in the asphalt composition, in step 310 the binder modifier can be added to an aggregate. The aggregate can be added to the binder modifier at a temperature of 140 to 180 degrees Celsius. A pug mill can be used to mix the aggregate with the binder modifier.

In step 320 the initial binder can be added to the binder modifier aggregate, if any. The initial binder can be mixed with the binder modifier and the aggregate, if any, at a temperature of up to 140 degrees Celsius for 30 to 60 seconds. The initial binder can be mixed with the binder modifier and the aggregate, if any, in a pug mill.

Elemental sulfur can then be added to the initial binder and binder modifier and the aggregate, if any, in step 330. The elemental sulfur can be mixed with the initial binder and the binder modifier, and the aggregate, if any, at a temperature of up to 140 degrees Celsius for 30 to 60 seconds. The mixing in step 330 can take place in a pug mill.

In certain embodiments when a pre-blended mixing method is used, the elemental sulfur can be in an amount of up to 50 weight percent, by weight of the modified asphalt binder. The crumb rubber can be in an amount of 10 weight percent to 20 weight percent, by weight of the intermediate binder.

In certain embodiments, the recycled plastic can be blended with the crumb rubber to form the binder modifier as pellets or alternately to form the binder modifier as a shredded product. In other alternate embodiments, the recycled plastic can be blended with the crumb rubber at a ratio of 1:2. In alternate embodiments, a filler can be added as part of the aggregate or in place of the aggregate. The filler can be, for example, a limestone powder, a cement dust, an oil ash, and a combination of such fillers. The filler, if any, can be added to a heated binder modifier and mixed in a mixer.

Pre-Blend with Sulfur Mixing Method

Figure 6:
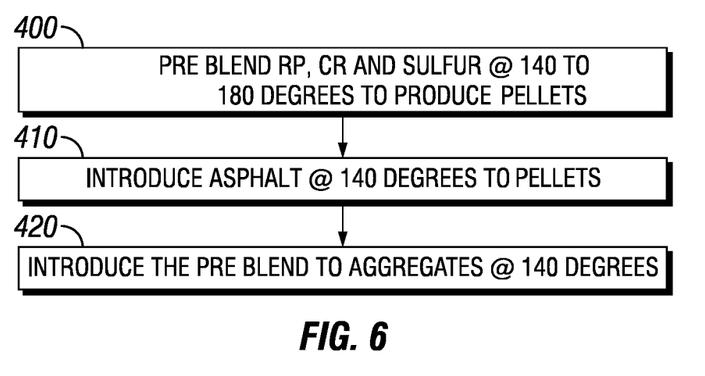
FIG. 6 shows the steps of a pre-blend with sulfur mixing method for forming an asphalt composition having a modified asphalt binder, in accordance with an embodiment of this disclosure.

In another aspect of the disclosure, a pre-blend with sulfur mixing method can be used for making the asphalt composition, as shown in FIG. 6. In embodiments using the pre-blend with sulfur mixing method, in step 400 a recycled plastic can be blended with a crumb rubber and an elemental sulfur to form a sulfur binder modifier. The recycled plastic can be blended with the crumb rubber and elemental sulfur at a temperature of 140 to 180 degrees Celsius, in stages. In an initial stage the recycled plastic and crumb rubber can be mixed at a temperature above 140 degrees Celsius, without the elemental sulfur. The blending of the recycled plastic and the crumb rubber can be accomplished in a few seconds depending on the speed of the mixer.

The speed of the mixer can be, for example 3400 rpm. The mixer can be, for example, a high shear mixer to allow for homogeneous mixing of the recycled plastic and the crumb rubber. The mix of recycled plastic and crumb rubber can then be held in the reaction tank for up to 60 minutes. At this stage, the mixing and bonding of the recycled plastic and crumb rubber may be aided by the use of admixtures. These admixtures may include turpentines, synthetic hard wax or oils. Over such holding time the temperature of the mix of recycled plastic and crumb rubber can reduce to below 140 degrees Celsius. The elemental sulfur can then be added and blended with the recycled plastic and crumb rubber in a sequential stage after the temperature is reduced to below 140 degrees Celsius to form the sulfur binder modifier. The recycled plastic, crumb rubber, and elemental sulfur can be mixed to arrive at a sulfur binder modifier in a pellet form.

In step 410 an initial binder can be added to the sulfur binder modifier pellets. The initial binder can be mixed with the sulfur binder modifier at a temperature of up to 140 degrees Celsius for 30 to 60 seconds in a pug mill mixer.

In step 420 the aggregates can then be added to the mix of initial binder of sulfur binder modifier. The aggregates and mix of initial binder of sulfur binder modifier can be blended at a temperature of 140 degrees Celsius. The aggregates and mix of initial binder of sulfur binder modifier can be blended in a pug mill.

In other alternate embodiments, the elemental sulfur can be in an amount of 30 to 50 weight percent, by weight of the modified asphalt binder. The crumb rubber can be in an amount of 10 weight percent to 20 weight percent, by weight of the intermediate binder.

In alternate embodiments, a filler can be added. The filler can be, for example, a limestone powder, a cement dust, an oil ash, and a combination of such fillers. The filler can be used, for example, in embodiments where the asphalt composition is used for roofing, waterproofing, or damp proofing applications. The filler, if any, can be added to the mixer in step 410 after the initial binder is added to the sulfur binder modifier pellets and heated.

EXAMPLES

In an example embodiment, the initial binder is in an amount of 70 weight percent, by weight of the intermediate binder; the crumb rubber is in an amount of 20 weight percent, by weight of the intermediate binder; the recycled plastic is in an amount of 10 weight percent, by weight of the intermediate binder; the elemental sulfur is in an amount of 50 weight percent, by weight of the modified asphalt binder; and the intermediate binder is in an amount of 50 weight percent, by weight of the modified asphalt binder.

In an alternate example embodiment, the elemental sulfur is in an amount of 30 weight percent, by weight of the modified asphalt binder; the crumb rubber is in an amount of 12 weight percent, by weight of the intermediate binder; and the recycled plastic is in an amount of 10 weight percent, by weight of the intermediate binder.

Embodiments of this disclosure therefore provide for the use of recycled plastic to create a circular economy in construction through usage and recycling. The asphalt composition that includes recycled plastic, crumb rubber, and elemental sulfur offers durable pavements with improved elastic behaving having a longer useful life, reducing the construction, maintenance, and repair costs. The use of sulfur, crumb rubber, and recycled plastic in the modified asphalt of embodiments of this disclosure will result in an asphalt composition with an improved Performance Grade, reducing rutting, cracking, and deformation of the asphalt composition that utilizes the modified asphalt binder compared to currently available asphalt compositions that lack such components.

The asphalt compositions of the present disclosure have improved properties over those of the initial binder alone. For instance, in some embodiments, the asphalt composition used for paving applications can provide a reduction in noise levels, which is particularly ideal for highways near residential, hospital and school areas. The asphalt composition used for paving applications can further provide improved pavement quality, improved durability, and require less maintenance, which can be of particular usefulness in medium to heavy traffic areas. For roofing, waterproofing, and damp proofing applications, the asphalt binder composition of embodiments of this disclosure will provide elasticity to roofing, waterproofing and damp proofing. The composition will also able to resist cracking, deformation and heat resistance due to asphalt modification and will promote a circular economy.

The asphalt compositions described herein can be used for a number of different purposes, including applications where improved roofing, waterproofing, and damp proofing are desired. In some embodiments, the asphalt composition is used in paving applications.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. An asphalt composition having:
    a modified asphalt binder including:
        an initial binder, the initial binder comprising asphalt, where the initial binder is in an amount of 35 to 44.5 weight percent, by weight of the modified asphalt binder;
        an added elemental sulfur, where the added element sulfur is in an amount of 50 weight percent, by weight of the modified asphalt binder;
        a recycled plastic, the recycled plastic selected from the group consisting of low density polyethylene (LDPE), linear low density polyethylene LLDPE, high density polyethylene (HDPE), and combinations of the same, where the recycled plastic is in an amount of 0.5 to 5 weight percent, by weight of the modified asphalt binder; and
        a crumb rubber, the crumb rubber including a recycled material, where the crumb rubber is in an amount of 5 to 10 weight percent, by weight of the modified asphalt binder; where
    the recycled plastic and the crumb rubber together define a binder modifier, and where the binder modifier and the initial binder together define an intermediate binder.

2. The asphalt composition of claim 1, further including an aggregate and where the modified asphalt binder is in an amount of a range of 4 weight percent to 6 weight percent, by weight of the asphalt composition.

3. The asphalt composition of claim 2, where the aggregate includes up to 30 weight percent of recycled asphalt pavement, by weight of the aggregate.

4. The asphalt composition of claim 1, where a weight ratio of the recycled plastic to the crumb rubber is 1:2.

5. The asphalt composition of claim 1, further including a filler selected from a group consisting of a limestone powder, a cement dust, an oil ash, and a combination of such fillers, where the filler is in an amount of up to 50 weight percent, by weight of the asphalt composition.

* * * * *